United States Patent [19]

Aramouni

[11] Patent Number: 5,215,770

[45] Date of Patent: Jun. 1, 1993

US005215770A

[54] REDUCED CALORIE FLAVORED POPCORN

[75] Inventor: Fadi M. Aramouni, Manhattan, Kans.

[73] Assignee: Kansas State University Research Foundation, Manhattan, Kans.

[21] Appl. No.: 851,274

[22] Filed: Mar. 13, 1992

Related U.S. Application Data

[63] Continuation-in-part of Ser. No. 763,973, Sep. 23, 1991, abandoned.

[51] Int. Cl.$^5$ .................. A23G 3/00; A23L 1/18; A23L 1/236
[52] U.S. Cl. .................. 426/93; 426/104; 426/548
[58] Field of Search .................. 426/93, 104, 548

[56] References Cited

U.S. PATENT DOCUMENTS

| | | | |
|---|---|---|---|
| 3,843,814 | 10/1974 | Grunewald-Kirstein | 426/307 |
| 3,876,794 | 4/1975 | Rennhard | 426/548 |
| 3,961,091 | 6/1976 | Caccavale et al. | 426/93 |
| 4,622,233 | 11/1986 | Torres | 426/548 |
| 4,759,937 | 7/1988 | Spector | 426/104 |

OTHER PUBLICATIONS

Pfizer Polydextrose for the market that's shaping up, by Pfizer Chemical Division, 1985.
June Roth, Old-Fashioned Candymaking, 1974; Published by Henry Regnery Co., Chicago, Illinois 60610; 97-98, 103-105, 143-149.

*Primary Examiner*—Jeanette Hunter
*Assistant Examiner*—Mary S. Mims
*Attorney, Agent, or Firm*—Hovey, Williams, Timmons & Collins

[57] ABSTRACT

Reduced calorie flavored popcorns are provided having flavored toppings containing significant quantities of polydextrose, together with water and one or more flavoring and sweetening agent(s), e.g., caramel, fruit flavorings or cinnamon, and a minor amount of sodium bicarbonate. Finished popcorns in accordance with the invention have a calorie content of up to about 100 calories per ounce, and in particularly preferred forms a calorie content of from about 60-65 calories per ounce, representing a 50% calorie reduction as compared with conventional products. Where air-popped popcorn is used, the calorie content is up to about 85 calories per ounce.

5 Claims, No Drawings

REDUCED CALORIE FLAVORED POPCORN

This application is a continuation-in-part of application Ser. No. 07/763,973, filed Sep. 23, 1991, now abandoned.

BACKGROUND OF THE INVENTION

1. Field of the Invention

The present invention is broadly concerned with reduced calorie flavored popcorns, optionally sweetened only with fruit juices, and having taste and mouth feel characteristics closely analogous to their full calorie counterparts. More particularly, it is concerned with such flavored popcorns wherein the flavored toppings thereof have a relatively high proportion of polydextrose, with the resultant popcorns having a calorie content of up to about 100 calories per ounce, and more preferably up to about 85 calories per ounce. The most preferred popcorns of the invention have calorie contents on the order of 60-65 calories per ounce, representing a 50% reduction in calories as compared with conventional flavored popcorns.

2. Description of the Prior Art

Many consumers enjoy flavored popcorns, the most typical being caramel, fruit-flavored and cinnamon-flavored popcorns. The traditional toppings applied to popcorn to create the flavored varieties are relatively high in calories (for example, typical caramel corn has 120-130 calories per ounce), owing to the use of large quantities of sucrose and corn sweeteners therein. This has created a concern among health-conscious consumers, and consequently, attempts have been made to produce reduced calorie flavored popcorns. However, the goal of calorie reduction cannot be achieved simply by reducing or eliminating sugar together with use of artificial high potency sweeteners; the resultant flavored toppings simply do not meet the dictates of consumer demand insofar as taste and mouth feel are concerned.

There is accordingly a real and unsatisfied need in the art for flavored popcorn toppings having significantly reduced calorie contents which at the same time closely mimic the organoleptic properties of conventional, high calorie toppings.

U.S. Pat. No. 4,622,233 described in Example 44 a sugarless soft candy caramel which includes polydextrose as a sugar substitute. However, this candy contains a substantial fraction of fat by virtue of the presence of cream and evaporated milk; on a calculated basis, this formulation derives about 18% of its caloric content from fat. In addition, this product is designed for as is consumption, and would be totally unsuited as a topping for popcorn, being too chewy an virtually impossible to evenly apply.

Old-Fashioned Candymaking by Jun Roth (1974) describes the preparation of sponge candies which are made by the addition of large quantities of baking soda during the last stages of the candymaking operation. Baking soda is added to foam up the candy to an aerated mass. When cooled, the texture of the candy lacks the glasslike quality of a brittle, but has a porous appearance. A sponge candy recipe set forth in this book advocates the use of very significant quantities of sugar and corn syrup. As a consequence, such a sponge candy would be very high in calories. Moreover, it would not be applicable as a topping for popcorn.

SUMMARY OF THE INVENTION

The present invention overcomes the problems outlined above and provides greatly reduced calorie flavored popcorn toppings. Broadly speaking, the toppings of the invention include (and preferably consists essentially of) polydextrose, flavoring and sweetening agent(s), and a minor amount of (e.g., from about 0.7-1.5% by weight) of sodium bicarbonate. The polydextrose is present in an amount a relatively high proportion of polydextrose, on the order of at least about 30% by weight, and more preferably from about 40-70% by weight. In addition, the toppings may include water (either alone or as a part of a sweetener), with the water typically being present at a level of from about 5-20% by weight. The toppings are also essentially free of fat, and in most cases are completely free thereof. This further enhances the goal of calorie reduction. In practice the present toppings would derive no more than about 5% of the total caloric content thereof from fat.

The toppings also include flavor and sweetening ingredients, which may comprise a plurality of ingredients or a single ingredient. For example, where reduced calorie caramel popcorn is desired, the flavoring/sweetening agent would consist of brown sugar and high fructose corn syrup, with the brown sugar content being reduced by approximately two-thirds as compared with normal caramel topping. On the other hand, if another flavored popcorn is desired, the flavoring and sweetening ingredients may comprise the appropriate flavor concentrate or oil, e.g., grape, orange, cherry, strawberry, caramel, cinnamon, mint or toffee concentrate. Such flavoring ingredients may, if desired, be sweetened with a clarified fruit concentrate such as that of white grape or pear. Another possibility would be cinnamon flavored popcorn, in which event the flavoring ingredient would be cinnamon. It will be appreciated in this respect that the invention is not limited to any particular type of flavoring or sweetening agents, and virtually any agent(s) of this character can be used. Generally speaking, the flavoring and sweetening agent(s) should be present in the toppings at a level of from about 20-60% by weight.

The toppings of the invention also include a minor amount of baking soda, which prevents crystallization of the toppings and reduces bitter flavors. Optional ingredients include salt.

While it has been suggested in the prior art to use polydextrose as a sugar substitute in caramel candy, in the toppings of the present invention, use of polydextrose allows for essentially complete elimination of fat, and very substantial reduction of high calorie sweeteners.

In formulation procedures, the polydextrose is advantageously first mixed with water (or water-containing fruit juice) with mixing under medium heat to dissolve the polydextrose. At this point, the remaining ingredients can be added, with appropriate mixing to achieve a uniform dispersion. In the case of caramel corn, the brown sugar and high fructose corn syrup are added in the second step with heating to approximately 280° F.

In preferred forms, the toppings of the invention are applied to air popped popcorn, inasmuch as this popcorn itself has a reduced calorie content as compared with oil-popped popcorn. However, if desired, popcorn prepared in oil can be used, although a penalty is paid in higher calorie content. In any event, the calorie content of the finished flavored popcorn should be up to about 100 calories per ounce, and, particularly if the preferred air-popped popcorn is employed, the calorie content of the finished flavored popcorn should be up to about 85 calories per ounce.

DESCRIPTION OF THE PREFERRED EMBODIMENTS

The following examples describe representative flavored toppings and complete flavored popcorns. It should be understood that these examples are illustrative in nature and nothing therein should be taken as a limitation upon the overall scope of the invention

EXAMPLE I

A reduced calorie caramel popcorn topping was prepared having the following constituents (for a one-ounce serving of popcorn):

| Ingredient | Grams | % By Weight |
|---|---|---|
| Polydextrose | 14.4 | 50.83 |
| Brown Sugar | 7.21 | 25.45 |
| HFCS[1] | 2.40 | 8.47 |
| Sodium Bicarbonate | .144 | .51 |
| Salt | .336 | 1.19 |
| Water | 3.84 | 13.55 |

[1]HFCS = High fructose corn syrup

In formulating the topping, the water was added to polydextrose with mixing under medium heat. Next, the brown sugar, HFCS and salt were added and the mixture was heated to 280° F., whereupon the heat was turned off. The sodium bicarbonate was then added, with mixing for 20 seconds.

The topping was applied over one ounce (3.82 grams) of air popped popcorn, with proper mixing to obtain good coverage. The coated popcorn was then spread on a cooling table, and was packed as soon as possible to avoid exposure of the product to humid air.

A one-ounce (28.4 grams) serving of the caramel popcorn (adjusted for bake loss of 11.94%) was analyzed with the following results:

| Cost | | | |
|---|---|---|---|
| | | Water Weight | 1.43 g |
| Calories | 63.5 | Vitamin B6 | .008 mg |
| Protein | .490 g | Vitamin B12 | 0 µg |
| Carbohydrates | 26.2 g | Folacin | 1.44 µg |
| Dietary Fiber | .625 g | Pantothenic | .018 mg |
| Fat-Total | .192 g | Vitamin C | 0 mg |
| Fat-Saturated | .019 g | Vitamin E | 0 mg |
| Fat-Mono | .086 g | Calcium | 6.73 mg |
| Fat-Poly | .074 g | Copper | .036 mg |
| Cholesterol | 0 mg | Iron | .350 mg |
| Vit A-Carotene | 0 Re | Magnesium | 15.6 mg |
| Vit A-Preformed | 0 Re | Phosphorus | 12.2 mg |
| Vit A-Total | 0 Re | Potassium | 107 mg |
| Thiamin-B1 | .015 mg | Selenium | .545 µg |
| Riboflavin-B2 | .007 mg | Sodium | 172 mg |
| Niacin-B3 | .099 mg | Zinc | .112 mg |
| Calories from protein: | 2% | Poly/Sat$_1$ = 3.9:1 | |
| Calories from carbohydrates: | 97% | Na/K = 1.6:1 | |
| | | Ca/Phos = 0.6:1 | |
| Calories from fats: | 2% | | |

EXAMPLE II

A reduced calorie candied popcorn topping was prepared as follows:

| Ingredient | Grams | % By Weight |
|---|---|---|
| Polydextrose | 13.9 | 50.86 |
| Grape Juice Conc. (70% solid) | 12.9 | 47.24 |
| Salt | .361 | 1.33 |
| Sodium Bicarbonate | .155 | .57 |

In the first step, the grape juice was added to the polydextrose and salt with mixing under medium heat. Next, the mixture was heated to 280° F., and the heat was turned off. Sodium bicarbonate was then added with additional mixing for twenty seconds. This preparation was then applied over 4.13 grams of air popped popcorn and spread on a cooling table prior to packing.

A one-ounce (28.3 grams) serving of the flavored popcorn (adjusted for bake loss of 10%) was analyzed as follows:

| Cost | | | |
|---|---|---|---|
| | | Water Weight | 1.45 g |
| Calories | 64.4 | Vitamin B6 | .045 mg |
| Protein | .844 g | Vitamin B12 | 0 µg |
| Carbohydrates | 25.5 g | Folacin | 3.02 µg |
| Dietary Fiber | .053 g | Pantothenic | .043 mg |
| Fat-Total | .252 g | Vitamin C | .057 mg |
| Fat-Saturated | .035 g | Vitamin E | .016 mg |
| Fat-Mono | .095 g | Calcium | 5.72 mg |
| Fat-Poly | .092 g | Copper | .027 mg |
| Cholesterol | 0 mg | Iron | .247 mg |
| Vit A-Carotene | .567 Re | Magnesium | 17.7 mg |
| Vit A-Preformed | 0 Re | Phosphorus | 17.8 mg |
| Vita A-Total | .567 Re | Potassium | 155 mg |
| Thiamin-B1 | .03 mg | Selenium | 1.09 µg |
| Riboflavin-B2 | .026 mg | Sodium | 184 mg |
| Niacin-B3 | .239 mg | Zinc | .145 mg |
| Calories from protein: | 3% | Poly/Sat$_1$ = 2.7:1 | |
| Calories from carbohydrates: | 95% | Na/K = 1.2:1 | |
| | | Ca/Phos = 0.3:1 | |
| Calories from fats: | 2% | | |

EXAMPLE III

The following toppings in accordance with the invention are formulated with the complete elimination of high fructose corn syrup and with a polydextrose to sugar ratio of 1.68:1.

Ingredient
Polydextrose—0.032 pounds
Brown Sugar—Best/Cane—0.019 pounds
Water—0.015 cup
Air Popped Popcorn—0.013 pounds
Salt—0.017 tablespoon
Sodium Bicarbonate—0.017 tablespoon The formulation procedure is exactly as set forth in Example I, except that the final cooking temperature is 260° F. A 28.3 gram sample of finished flavored popcorn was analyzed with the following results.

| Weight: 28.3 Grams (.997 oz.) | | | |
|---|---|---|---|
| (Adjusted for bake loss of 13%) | | Water Weight | .239 g |
| Calories | 68.3 | Vitamin B6 | .011 mg |
| Protein | .729 g | Vitamin B12 | 0 µg |
| Carbohydrates | 26.9 g | Folacin | 2.14 µg |
| Dietary Fiber | .929 g | Pantothenic | .027 mg |
| Fat-Total | .286 g | Vitamin C | 0 mg |
| Fat-Saturated | .029 g | Vitamin E | 0 mg |
| Fat-Mono | .129 g | Calcium | 8.11 mg |
| Fat-Poly | .111 g | Copper | .046 mg |
| Cholesterol | 0 mg | Iron | .447 mg |
| Thiamin-B1 | 0.22 MG | Magnesium | 21.8 mg |

| Riboflavin-B2 | .01 Mg | Phosphorus | 17.7 mg |
| --- | --- | --- | --- |
| Niacin-B3 | .143 Mg | Potassium | 116 mg |
| | | Selenium | .787 μg |
| | | Sodium | 152 mg |
| | | Zinc | .165 mg |
| Calories from protein: | 3% | Poly/Sat$_1$ = 3.9:1 | |
| Calories from carbohydrates: | 95% | Na/K = 1.3:1 Ca/Phos = 0.5:1 | |
| Calories from fats: | 2% | CSI = 0.0 | |

A similar flavored popcorn was produced using the following topping.

Ingredients
Polydextrose—0.03 pounds
Pear Juice Concentrate (70% solids)—0.026 pounds
Air Popped Popcorn—0.012 pounds
Salt—0.016 tablespoon
Sodium Bicarbonate—0.016 tablespoon The formulation proceeded as in Example II, except that the cooking temperature was again 260° F. A one ounce serving of this flavored popcorn was tested with the following results.

| Weight: 28.4 Grams (1 oz.) (Adjusted for bake loss of 10%) | | Water Weight | 1.19 g |
| --- | --- | --- | --- |
| Calories | 66.2 | Vitamin B6 | .078 mg |
| Protein | .757 g | Vitamin B12 | 0 μg |
| Carbohydrates | 26.2 g | Folacin | 2.14 μg |
| Dietary Fiber | 1.27 g | Pantothenic | .027 mg |
| Fat-Total | .28 g | Vitamin C | 0 mg |
| Fat-Saturated | .028 g | Vitamin E | 0 mg |
| Fat-Mono | .125 g | Calcium | 8.11 mg |
| Fat-Poly | .108 g | Copper | .046 mg |
| Cholesterol | 0 mg | Iron | .447 mg |
| Vit A-Carotene | 0.52 RE | Magnesium | 21.8 mg |
| Vit A-Total | 0.52 RE | Phosphorus | 17.7 mg |
| Thiamin-B1 | 0.22 Mg | Potassium | 116 mg |
| Riboflavin-B2 | .014 Mg | Selenium | .787 μg |
| Niacin-B3 | .187 Mg | Sodium | 152 mg |
| | | Zinc | .165 mg |
| Calories from protein: | 3% | Poly/Sat$_1$ = 3.9:1 | |
| Calories from carbohydrates: | 95% | Na/K = 1.6:1 Ca/Phos = 0.2:1 | |
| Calories from fats: | 2% | | |

In both of the above cases, the calories derived from fats came from the popcorn, as opposed to the topping formulation employed.

What is claimed is:

1. Reduced calorie flavored popcorn, consisting essentially of:
    a quantity of plain popped popcorn; and
    an amount of flavored topping applied to said popcorn and consisting essentially of at least about 30% by weight polydextrose, flavoring and sweetening agent(s), and from about 5-20% by weight of water,
    said flavored topping being essentially free of fat,
    said flavored popcorn having a calorie content of up to about 100 calories per ounce, said flavored popcorn having been prepared by first mixing together and heating the ingredients of said flavored topping in the absence of said popped popcorn to a maximum temperature of about 280° F. to create a flowable topping, and thereafter applying the prepared flavored topping over said popped popcorn.

2. The popcorn of claim 1, said agent(s) being selected from the group consisting of the concentrates or oils of grape, orange, cherry, strawberry, caramel, cinnamon, mint or toffee.

3. The popcorn of claim 2, said caramel agent(s) comprising respective quantities of brown sugar and high fructose corn syrup.

4. The popcorn of claim 1, said popped popcorn being air popped popcorn.

5. The popcorn of claim 5, including sodium bicarbonate present in said flavored topping at a level of from about 0.7-1.5% by weight.

* * * * *